United States Patent
Hesmer

(10) Patent No.: US 6,409,188 B1
(45) Date of Patent: Jun. 25, 2002

(54) CARRYING APPARATUS FOR GOLF BAG PULL CART AND GOLF BAG

(75) Inventor: Ronald G. Hesmer, Wilmington, NC (US)

(73) Assignee: Ron Hesmer, Wilmington, NC (US)

( * ) Notice: Subject to any disclaimer, the term of this patent is extended or adjusted under 35 U.S.C. 154(b) by 0 days.

(21) Appl. No.: 09/495,958

(22) Filed: Feb. 2, 2000

(51) Int. Cl.$^7$ ................................................ A63B 55/08
(52) U.S. Cl. ........................ 280/79.5; 280/204; 248/96; D34/15
(58) Field of Search ....................... 280/DIG. 5, DIG. 6, 280/204, 292, 79.5; 248/96; D34/15; D12/16; 206/315.3; 150/159; 224/521, 520, 519, 274, 525, 532, 917.5, 511, 512, 504, 506, 523, 527, 530, 531, 488, 924

(56) References Cited

U.S. PATENT DOCUMENTS

| | | | | |
|---|---|---|---|---|
| 1,313,959 A | * | 8/1919 | Smith | 224/527 |
| D163,327 S | * | 5/1951 | Rose | D14/3 |
| D178,341 S | * | 7/1956 | Dacus | D14/3 |
| 3,871,464 A | * | 3/1975 | Eden | 180/19 |
| 4,061,257 A | | 12/1977 | St. Clair | 224/42.08 |
| D261,749 S | | 11/1981 | Hampton | D34/15 |
| 4,337,882 A | | 7/1982 | Hampton | 224/42.03 R |
| 4,371,184 A | * | 2/1983 | Henden et al. | 280/204 |
| 4,726,597 A | * | 2/1988 | Hickin | 280/47.17 |
| 4,759,559 A | | 7/1988 | Moulton | 280/40 |
| D301,789 S | * | 6/1989 | Tomoda | D34/15 |
| 5,029,740 A | | 7/1991 | Cox | 224/42.01 |
| 5,052,604 A | * | 10/1991 | Tourangeau | 224/274 |
| 5,351,983 A | | 10/1994 | Descalo | 280/646 |
| 5,458,350 A | * | 10/1995 | Johnson et al. | 280/47.26 |
| 5,468,006 A | | 11/1995 | Delserro | 280/202 |
| 5,482,304 A | | 1/1996 | Smith | 280/204 |
| 5,738,261 A | | 4/1998 | Dula | 224/533 |
| 5,788,135 A | | 8/1998 | Janek | 224/527 |
| 5,806,738 A | | 9/1998 | D'Angelo | 224/521 |
| 5,860,519 A | * | 1/1999 | Meyer et al. | 206/315.3 |
| 5,881,937 A | * | 3/1999 | Sadler | 224/509 |
| 6,036,070 A | * | 3/2000 | Gauthier et al. | 224/527 |
| 6,039,227 A | * | 3/2000 | Stark | 224/521 |
| 6,068,325 A | * | 5/2000 | Hughes | 296/100.16 |
| 6,105,843 A | * | 8/2000 | Dollesin | 224/509 |
| 6,168,058 B1 | * | 1/2001 | Janek | 224/527 |

* cited by examiner

Primary Examiner—J. J. Swann
Assistant Examiner—J. Allen Shriver
(74) Attorney, Agent, or Firm—Mills Law Firm PLLC

(57) ABSTRACT

A trailer hitch mounted carrying apparatus for golf bag pull carts, golf bags, or golf bags mounted on pull carts. A generally cylindrical carrier is mounted to a trailer hitch connection. The cylindrical carrier is rigid and with a slot cut in it. A folded golf bag pull cart may be mounted within the carrier with the wheels and handle outside of the carrier, either with or without a golf bag mounted on the pull cart. Alternatively, a golf bag may be mounted within the carrier. The carrier is equipped with a lockable cover to secure the contents, whether a golf bag filled with clubs or a golf bag and pull cart within the carrier. The carrier may be mounted to either a female trailer hitch on the rear of a vehicle or a bar-type trailer hitch on the rear of a vehicle. The carrier may be equipped with added wheels on the carrier so that the carrier may be utilized for wheeled movement, including towing behind a bicycle.

10 Claims, 6 Drawing Sheets

CARRYING APPARATUS FOR GOLF BAG PULL CART AND GOLF BAG

BACKGROUND OF THE INVENTION

1. Field of the Invention

This present invention relates to a carrying apparatus for golf bag pull carts, and/or golf bags, both mounted on the pull cart and apart from the pull cart This invention is to be used with vehicles that have a trailer hitch mount so that the carrying apparatus may be mounted on the trailer hitch at the rear of the vehicle or it could be used in one embodiment with a bicycle.

2. Description of Related Art

Many personal vehicles are bought new with a trailer hitch or have a trailer hitch added as an after market accessory. These hitches are commonly used for towing such things as trailers with small boats or personal water crafts, utility trailers, and the like. These trailer hitches come in two basic designs. One has a female mounting with a removable male member that mounts tile trailer hitch ball. In this type of trailer hitch, when the hitch is not in use, the male member is removed and the rearwardly projecting male member with the hitch ball mounted thereon is in storage. The second type of trailer hitch has a rearwardly projecting, permanently mounted, bar-like metal member. The trailer hitch ball is ordinarily secured on the bar-like metal member by means of a bolt hole in the metal piece and a bolt topped by a trailer hitch ball secured to the trailer hitch bar by a nut. The bolt is passed through the trailer hitch member and secured on the underside of the trailer hitch member by a nut and washer. Typically, the bolt with the hitch ball is removable from the trailer hitch member because some types of trailers require different size hitch balls.

It is well known that the trailer hitch mounting may be used for carrying things or for supporting things other than a wheeled trailer. For example, in Janek, U.S. Pat. No. 5,788,135, a cargo carrier assembly is shown mounted to a female hitch member on a vehicle. Cox, U.S. Pat. No. 5,029,740 shows a luggage rack with a wheeled transport mechanism pivotally locked to support mechanism and mounted to a hitch reception member on the vehicle.

Additionally, it has been long recognized there can be a need for specialized mechanisms for carrying golf equipment, including both a golf bag and a golf pull cart on a car. For example, St. Clair, U.S. Pat. No. 4,061,257 discloses a golf bag and golf pull cart carrier. This is constructed much like a bicycle rack in that it has a frame attached to the rear bumper of an automobile and a carrier rack that is separably attached to the bumper mounted frame. Hampton, U.S. Pat. No. 4,337,882 discloses a hitch mounting carrier for a golf pull cart. D'Angelo, U.S. Pat. No. 5,806,738 discloses a hitch mounting framework on which a golf bag can be secured in an upright position by means of adjustable belts and buckles and an upright support piece. Smith, U.S. Pat. No. 5,482,304, discloses an attachment for connecting a bicycle to a golf pull cart so that the bicycle may pull the golf pull cart behind the bicycle. The Smith '304 patent allows one to use a bicycle to pull a golf pull cart Presumably, the operator could use the bicycle for transportation of the golf pull cart to the golf course or use the bicycle and the golf pull cart for movement around the golf course while actually playing a round. However, the Smith '304 patent utilizes wheels built into the golf pull cart for wheeled movement of the device. Most golf pull carts have relatively small wheels that are designed for only movement at or near walking speed and only on relatively soft surfaces like turf or ground. For this reason, most golf carts have solid wheels that are puncture proof but are not readily adopted for bicycle speeds across rough pavement or uneven hard surfaces.

Despite the above outlined inventions, there is an unmet need for a device for golfers who wish to carry a bag or a golf pull cart, or a bag and golf pull cart together in their vehicle. Many golfers prefer to walk when playing golf rather than renting an electric or gasoline powered riding golf cart from the course on which they play. However, many of these same golfers prefer not to physically carry their bags across their shoulders by the customary bag strap. Many of these golfers will use a small, usually aluminum framed, foldable pull cart, especially designed and adopted for holding a golf bag. These golf pull carts are light, can be bought for less than $100.00, and make it possible for a golfer to walk while playing golf without the added effort or even drudgery of carrying his or her own bag.

However, these golf pull carts have drawbacks. A golf bag itself is a relatively bulky item oftentimes more than 50 inches in length when filled with clubs. Two full sized golf bags will go a long way toward filling up the trunk of a compact car. When two folded pull carts are added, it will fill up the trunk of almost any car, leaving little, if any, room for luggage or other items that the user might wish to carry. This can be a problem on even short trips from one's home to a nearby golf course or a larger problem when one is traveling on vacation when the need to carry other luggage and materials is increased. Also in transporting a golf cart and a golf bag in the trunk of a car, the golf cart and golf bag will be ordinarily separately packed into the trunk. Ordinarily, the user will remove the golf cart from the bag and unfold it, then he will take the golf bag from the trunk, place it on the unfolded golf cart and secure it in place, usually by straps and clips. The process must be reversed when the round is over and the bag and cart are to be returned to the trunk. Additionally, an increasing number of people are living in a development that is built on or around a golf course. Oftentimes a person will live more than a comfortable walking distance to the golf course club house, but still within a short bicycle ride. If means could be found for transporting a pull cart and golf bag by a bicycle then that would make it possible, for those who live within easy bicycling range of their golf course, to avoid taking a car every time they wish to play golf.

Consequently, it would be an advance in the art to provide for an article carrying apparatus especially designed to carry both a golf bag and golf cart together, a golf bag alone, or golf cart alone that could be readily attached and detached to an existing trailer hitch attachment on the back of a vehicle or that could be adapted for towing by a bicycle. When in use, this apparatus would provide that the storage capacity, especially the trunk of the vehicle, would not be used by golf bags and golf carts and would provide ready access to the trunk of the vehicle as necessary. It could be used for short trips to a nearby golf course or could be used for long trips across the country. The apparatus can be equipped with a cover, both to provide protection for the contents of the carrier apparatus in inclement weather and to secure the contents within the carrier apparatus to prevent theft or vandalism. The article carrying apparatus could have detachable bicycle-like wheels so that the golf carrying apparatus could be readily attached to a bicycle by a curved rigid metal rod, which would enable one to ride a bike to the golf course simultaneously towing the golf bag and/or golf cart.

SUMMARY OF THE INVENTION

The current invention is a trailer hitch accessory device designed to carry a golf walking pull cart together with a bag or either item individually. This invention has means for attachment to a trailer hitch either the female type receiver or the permanently mounted bar type trailer hitch. For a female type receiver it will simply be an appropriately sized male bar member to slide within the female receptacle. On the bar type hitch it will be a bar member to fit over the hitch bar for attachment to the hitch bar by means of a bolt and nut. Distal from the end of the trailer hitch attachment is a framework with a generally cylindrical receiver fixed thereon. The cylindrical receiver is appropriately sized with appropriate slots so that a golf bag may be secured therein or a golf cart may be secured therein or a golf bag attached to a golf cart may be secured therein. It is anticipated in most applications the golf cart and bag will be attached together, the golf cart folded appropriately, and the folded golf cart with the attached golf bag placed within the cylindrical receiver. When transporting the golf bag and cart short distances, the receiver will be open and uncovered. A locking cover could be supplied which will secure the golf cart and bag within the receiver. This serves a dual purpose of protecting the golf bag contents and the golf bag from theft or vandalism, while also shielding it from the elements. If the invention is to be used for short trips from the owner's home to the golf course, the receiver will be open. However, if the bag is to be transported for long distances, like from home to a vacation spot where overnight travel may be required or the car may be left unattended, then the cover will be used and locked into place. This device may be made for receipt of one golf pull cart or golf bag or a combination thereof, or there may be more than one cylindrical receiver mounted thereon for receipt more than one golf pull cart and golf bag. In one embodiment of the invention the device will have a means for moving the cylindrical receiver away from the point of attachment to the hitch, so that access to a trunk or rear hatchway door will not be impeded by use of this device. In another embodiment, pneumatic bicycle-like wheels may be attached to the device so that the trailer hitch receiver may be used to attach the device to the back of a bicycle so that it may be towed by an operator of the bicycle short distances, usually from the home of an owner who lives at or near the golf course where the clubs and cart will be used.

DETAILED DESCRIPTION OF THE DRAWINGS

Figure 1A:
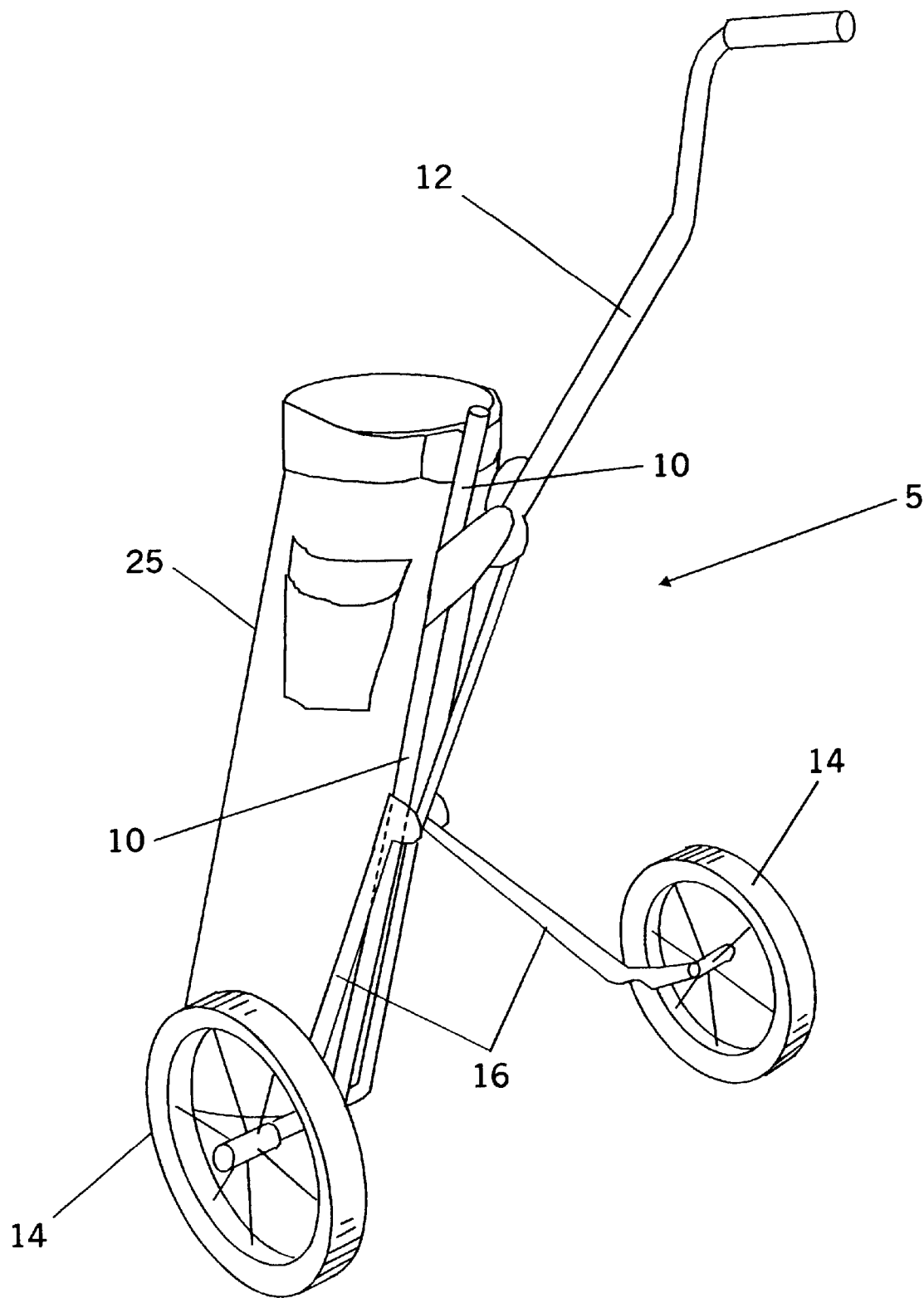
FIG. 1A shows a pull cart opened with a golf bag placed thereon.

FIG. 1A shows a golf pull cart (5) with a golf bag (25) secured thereon. The golf bag (25) does not have any clubs placed therein in this view for illustrative purposes only.

Figure 1B:
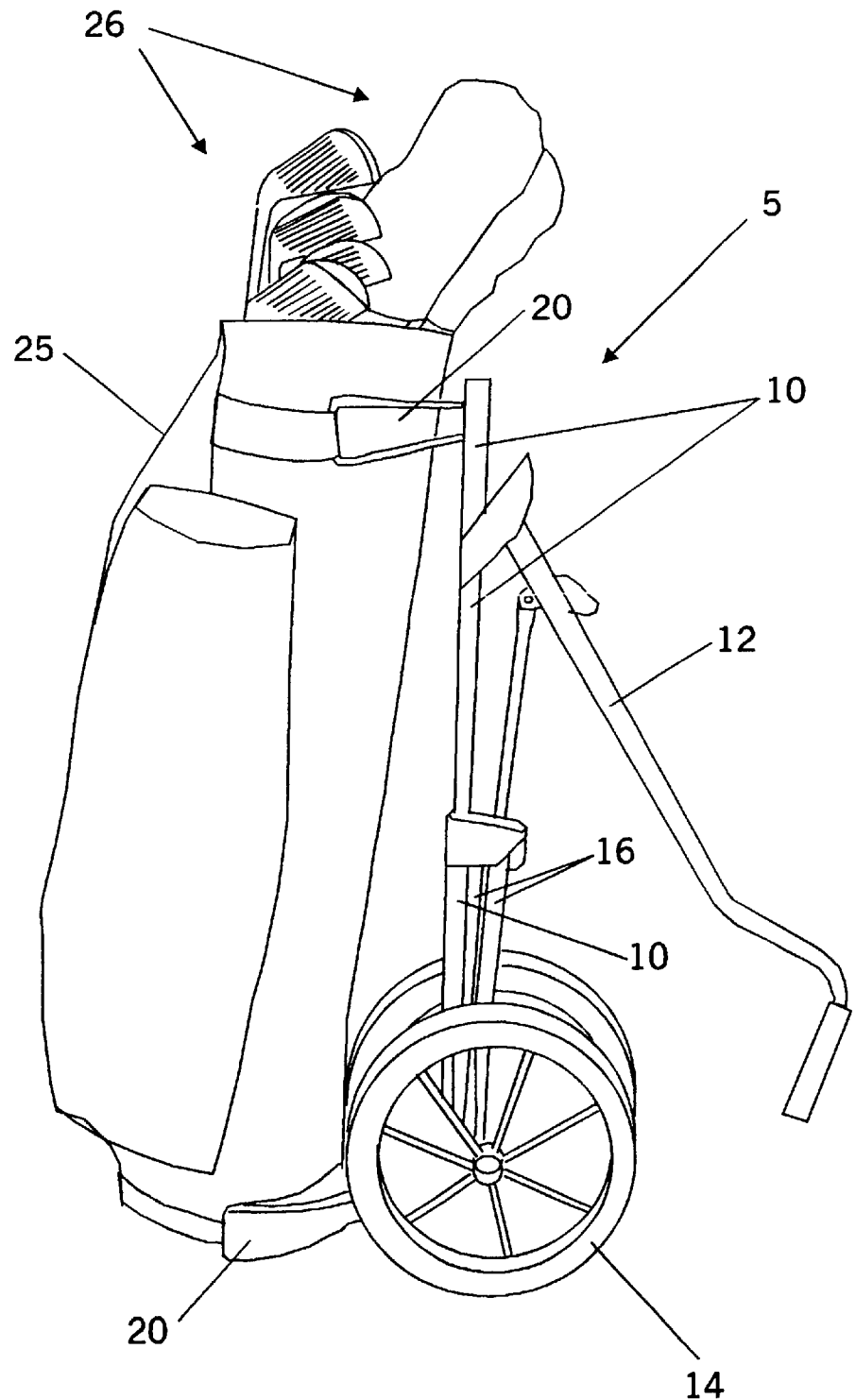
FIG. 1B shows a pull cart with an attached golf bag folded for storage or transport

Ordinarily, a pull cart (5) consists of a support piece (10) with a folding handle (12) attached at or near one end of the support piece (10). Wheels (14) are connected to the support piece (10) by folding axles (16). The handle (12) will ordinarily rotate along a plane defined by the support piece (10) so that it can either extend upward and essentially parallel to the support piece (10) or be folded against the support piece (10) for ease of storage. The folded position of the handle (12) is shown in FIG. 1B where the handle (12) is folded down and in close proximity to the support piece (10). The wheels (14) fold inward in a wing-like fashion and nest close to the support piece (10), as is illustrated in FIG. 1B. At each end of the cylindrical support piece (10) there is usually a U-shaped piece (20) which will have some adjustable strap or similar device which will hold the golf bag (25) in place against the support piece (10) (seen in FIG. 1B).

If the operator has a sufficiently large storage space within his vehicle, the golf bag (25) with the golf clubs (26) therein may be left in place in the folded pull cart (5) (as shown in FIG. 1B) with the entire apparatus lifted in and out of a pick-up truck bed, the back of a van or SUV, or the like. If a car trunk is to be used, often the folded pull cart with an attached golf bag, as illustrated in FIG. 1B, will be too large and unwieldy for simple storage within a car trunk. Consequently, it is necessary to detach the bag (25) and store it separately from the folded pull cart (5). If one wishes to transport a golf bag (25) and the folded pull cart (5) while attached to each other in the trunk of a car, it is ordinarily necessary to lay the assemblage on its side. If the top of the golf bag (25) tilts downward, the clubs may begin to slide out of the bag. Most pull carts (5) primarily use gravity to hold the golf bag (25) in place within the pull cart (5) when in use. Consequently, the strap and clip arrangement that ordinarily holds the golf bag (25) against the support piece (10) are attached rather loosely to allow for easy removal of the golf bag (25) from the pull cart (5) when necessary. This loose attachment works against lifting the golf pull cart (5) with an attached golf bag (25) in and out of the trunk of a car. Consequently, most users prefer to transport the golf bag (25) and the pull cart (5) separately in a truck of a car. At the golf course the pull cart (5) is unfolded and set up then the golf bag (25) is attached to the pull cart (5). Even in relatively large trunks it can be difficult to store two golf bags and two folded storage carts. Although not large in size, pull carts are awkwardly shaped and difficult to fit within a trunk. To remove the bag, then remove the cart, then unfold the cart, then to mount the bag onto the cart is a tedious process, because the loading and unloading occur at the golf course at the beginning and end of a round and at the home of the user when departing for and returning from a golf course. Consequently, it is an advantage to be able to quickly load and unload the golf cart and bag when attached to each other.

Figure 2:
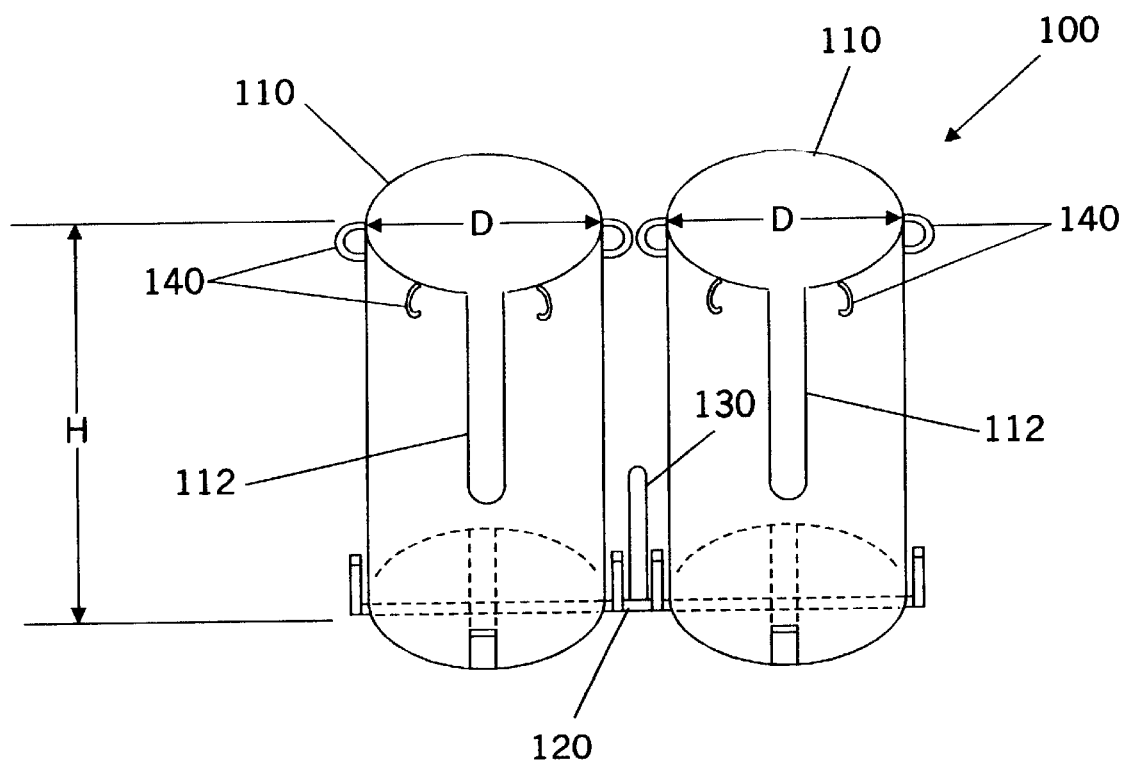
FIG. 2 shows one embodiment of the invention with two receivers mounted thereon.
Figure 3:
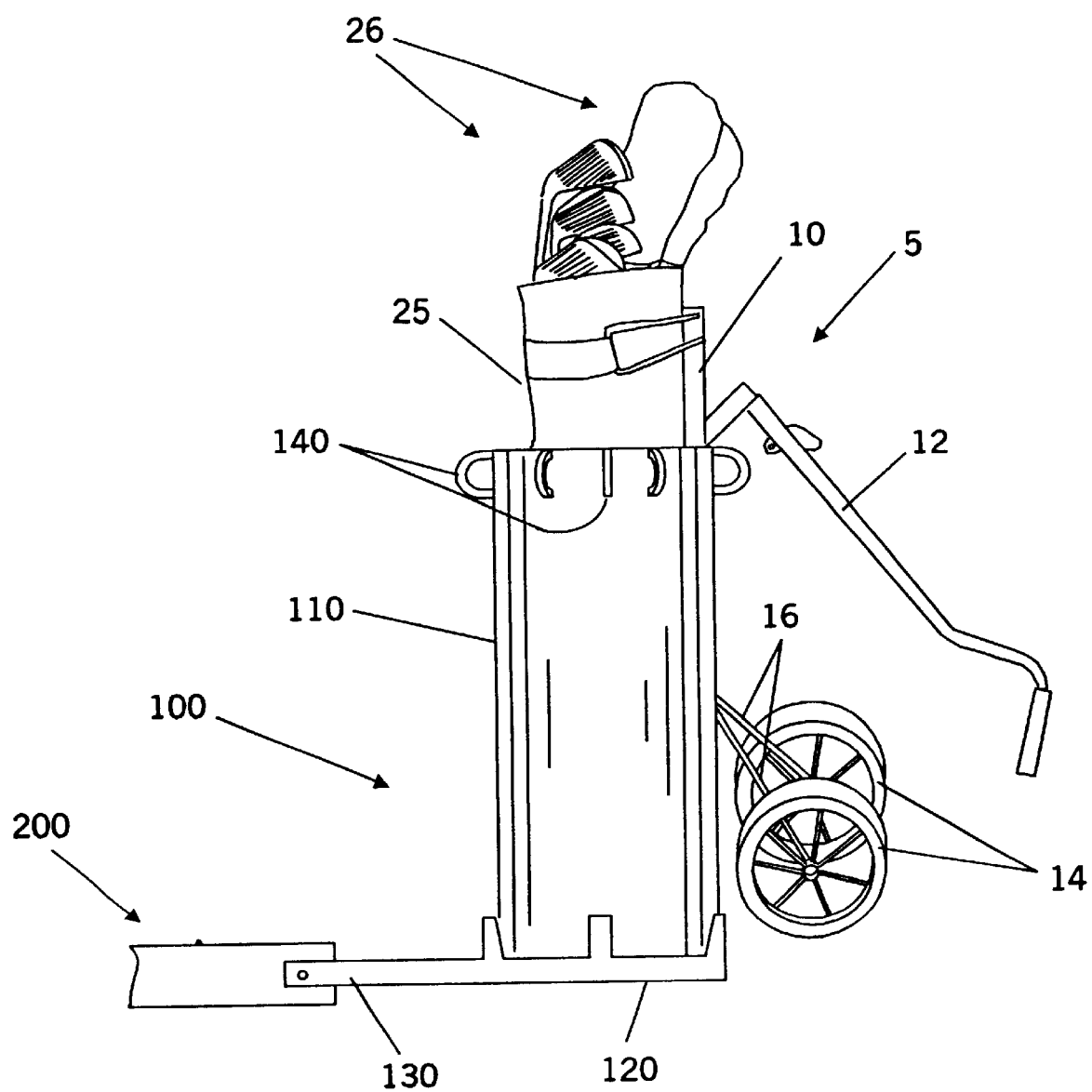
FIG. 3 shows a single receiver embodiment of the invention mounted in a female type trailer hitch with a golf bag and pull cart secured therein.
Figure 5:
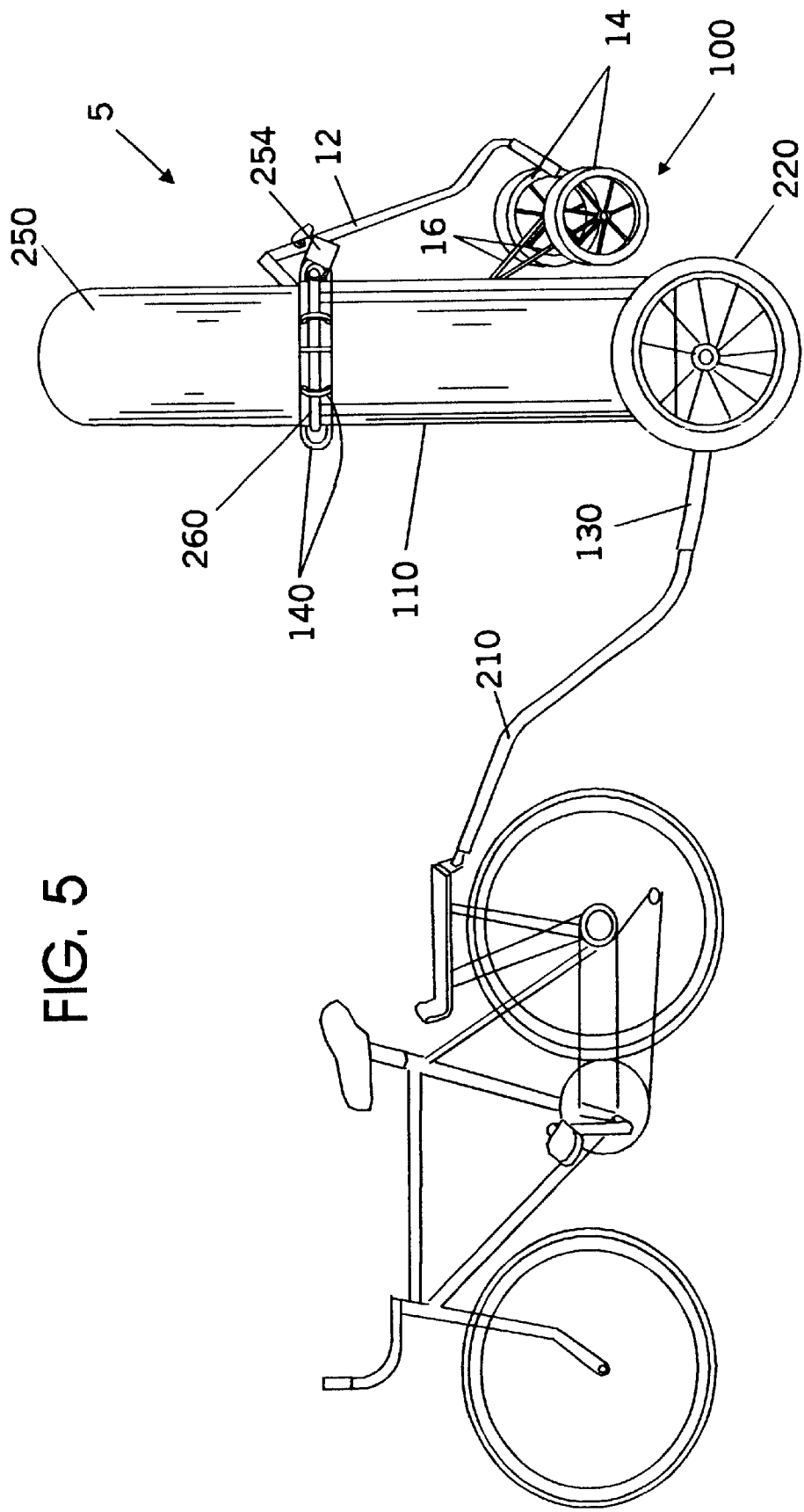
FIG. 5 shows a single receiver embodiment of the invention adapted for towing by bicycle.

FIG. 2 portrays one embodiment of the carrying apparatus (100). In this embodiment, there are two rigid cylindrical receivers (110). The receivers (110) may be made of any suitable weather resistant, rigid and durable material. Among other materials that would be suitable are aluminum, or stainless steel or various types of plastics, including polyethylene and polystyrene. The receivers (110) may vary somewhat in size, but most golf bags (25) are around eight and a half inches in diameter. Most golf bags (25) are generally cylindrical in shape, although a few have an oblong or trapezoidal cross-section. Professional golfers may carry bags that are ten and a half or even twelve inches in diameter, but a bag that large is unusual for the recreational golfer, especially the recreational golfer who carries his bag or walks the course pulling a pull cart (5) with his golf bag (25) loaded on the pull cart (5) (as shown in FIG. 1A). Consequently, a diameter (D) of approximately one foot for the receiver (110) will be suitable for most applications. The height (H) of the receiver (110) must be enough to effectively secure the golf bag and pull cart therein, but not be so high as to restrict the ability to place the golf bag (25) and the pull cart (5) within the receiver (110) and to remove it from the receiver (110). Consequently a height (H) around two feet will be correct for most applications. The receiver has a slot (112) cut therein beginning at the top of the receiver (110) and extending lengthwise for part of the height (H) of the receiver (110). The slot (112) is not necessary if only a golf bag (25) is to be secured within the receiver (110). However, in the event one wishes to secure a golf bag (25) mounted on a pull cart (5) in the receiver (110), the slot (112) is required so that the golf cart wheels (14) and the golf cart folding handle (12) will fit outside of the receiver (110) (as shown in FIG. 3). It would, of course, be possible to design a receiver (110) specifically to fit a particular design or brand of golf pull carts (5). However, this would limit the utility of the receiver (110) to that particular design. Moreover, it is believed that the widest variation in golf pull cart designs are in the size and design of the pull cart wheels (14). As shown in FIG. 3, it is believed that a generally cylindrical receiver (110) with a slot (112) which allows the wheels (14) and the folding handle (12) to remain outside of the cylindrical receiver (110), even when the golf bag (25) mounted on the pull cart (5) are within the receiver, is the best way of assuring the greatest versatility of use for the carrying apparatus (100). It is believed there are common design parameters employed by golf pull cart manufacturers which mean that virtually all golf pull carts with golf bag attached thereto can be appropriately secured within the receiver (110) by means of the slot (112). The receiver (110) will be secured to a support frame (120). The support frame (120) will ordinarily be made of a metal bar stock material. The bottom of the receiver (110) will be secured in place against a crossed arm arrangement of the support piece (120) and bolted or otherwise attached thereto. The support piece (120) will have a trailer hitch attachment (130) extending from it which can be designed to appropriately fit either a male or female trailer hitch receiver mounted on a towing vehicle. The trailer hitch attachment (130) is seen in more detail in FIGS. 6A and 6B. When one is using the golf cart carrying apparatus (100) for short trips from one's home to a golf course, it is not necessary that a cover, especially a locking cover be employed. However, it is anticipated the golf cart carrying apparatus (100) could be used for longer trips like vacations where the exposure to inclement weather or where the device may be left unattended for long periods of time will require a locking cover. To that end there are rings (140) placed around the upper circumference of the receiver (110). A weatherproof cover (250) (seen in FIG. 5) will have appropriate slots cut therein. This weatherproof cover (250) will be secured in place through the rings (140). A small chain or metal cable (260) can be threaded through the rings (140) and padlocked into place effectively securing the weatherproof cover (250) in place hence securing the golf bag (25) and pull cart (5) within the receiver (110) while also providing protection against inclement weather. A weatherproof cover (250) could be designed and attached in other ways than are shown in FIG. 5. So long as a lockable weatherproof cover is provided, then the carrying apparatus (100) utility is increased for long or overnight trips.

FIG. 3 shows a second embodiment of the golf cart carrying apparatus (100). In this embodiment, the golf cart carrying apparatus (100) has a single receiver (110) in place on the support piece (120). The golf bag (25) is shown in place inside the receiver (110) with golf clubs (26) placed within the golf bag (25). The pull cart (5) is shown mounted within the receiver (110) with the wheels (14) and the carrying handle (12) outside of the receiver (110) with the remainder of the pull cart (5) within the receiver (110). The rings (140) are shown in place around the upper rim of the receiver (110). The trailer hitch attachment (130) is simply seen as a bar extending from the support piece (120) extending into the trailer hitch (200). The trailer hitch (200) that is shown is a female hitch mount Ordinarily the trailer hitch attachment (130) will extend into the female hitch mount until an opening in the female trailer hitch (200) and the male hitch attachment (130) are in alignment. A metal pin will be placed through the opening and secured in place by means of a cotter pin or the like in the standard way known to one of ordinary skill in the art (shown in FIG. 6B).

Figure 4:
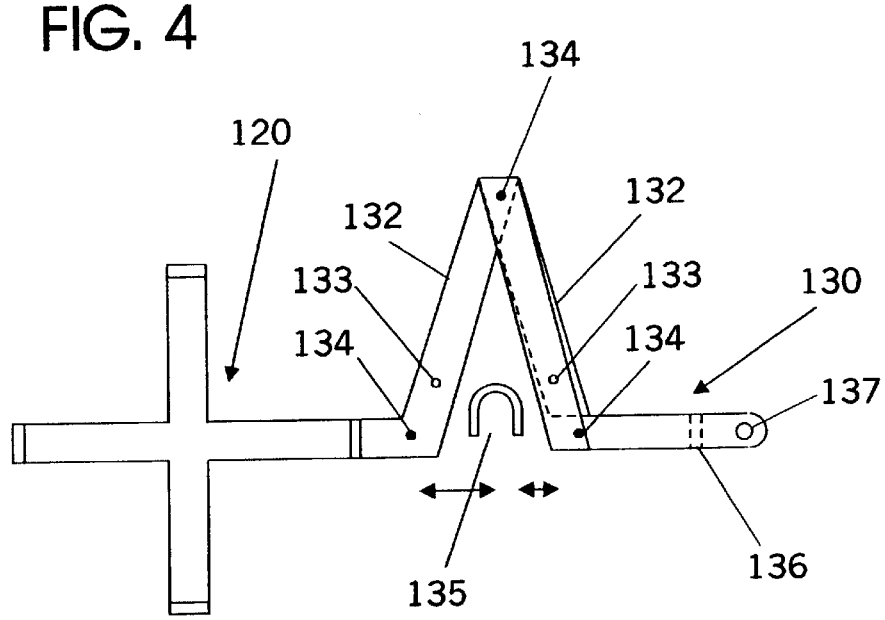
FIG. 4 shows a portion of a single receiver with a scissors-like piece.

FIG. 4 shows a detail of an alternative embodiment of the support piece (120) and the trailer hitch attachment (130) seen from above. Here, there are scissors bars (132) which are pivotally connected to each other by hinges (134). On the arms of the scissors bars (132) are two securing openings (133) for placement of an U-shaped securing pin (135). When one is using the carrying apparatus (100) for longer trips, vacations, or the like, then it will be useful to have easy and ready access to the trunk area of a vehicle without the necessity of removing the carrying apparatus (100) from the trailer hitch (200). By adding the pivoting scissors bar (132), one provides a simple means of moving the carrying apparatus (100) out of the way of the trunk. One simply removes the securing U-shaped pin (135) from the securing holes (133) and pulls the carrying apparatus (100) in the direction shown by the arrow, which causes the two scissors bars to separate pivoting on the hinges (134) allowing the support piece (120) hence, the carrying apparatus (100) (not shown), to be moved away from the trailer hitch connection by the distance of the length of the two scissors bars (132). One could then move much closer to the trunk area with the carrying apparatus out of the way to load and unload luggage and the like. On the trailer hitch attachment (130) there are ordinarily two bores. A vertical bore (137) pierces the trailer hitch attachment (130) from top to bottom. It is adopted for a bolt to be passed through the vertical bore (137) through a matching vertical bore in a bar-type trailer hitch mount and secured thereto by a nut and washer attaching to the bottom of the bolt (shown in FIG. 6A). There is also a horizontal bore (136) which passes from one side of the trailer hitch attachment (130) to the other side of the trailer hitch attachment. It is adopted for a female-type trailer hitch receiver. There, the male member of the trailer hitch attachment (130) is passed into the open female trailer hitch receiver until the lateral bore (136) is aligned with corresponding holes on the side of the female trailer hitch receiver where the device is then secured in place by a pin, bolt, or some such similar device (shown in FIGS. 6A and 6B). There are other means of moving the carrying apparatus (100) away from the trunk of a vehicle to increase access to the trunk. A single rotating bar would move the carrying apparatus (100) to the side and out of the way. A telescoping bar would also work. Other design equivalents are permitted within the scope of the invention.

FIG. 5 shows a single tube embodiment of the carrying apparatus (100) with the added features of detachable wheels (220) added to the support piece (120) at appropriate points. It is a simple matter to have two small metal rods protruding from the support piece (120) suitable for securing thereon to spoked pneumatic wheels on opposite sides of the support piece (120). Instead of attaching the trailer hitch connection (130) to a trailer hitch, it is attached to a curved metal rod (210) which attaches to the back of a bicycle. This enables one to tow the carrying apparatus (100) by a bicycle by means of the curved piece (210) and the trailer hitch connection (130) and the two added wheels (220). Thus, if one desires to ride one's bicycle to a nearby golf course, as will be practical for people who live on or adjacent to a golf course, then these add-on accessories for the carrying apparatus (100) will make it readily possible to do so. Also shown in FIG. 5 is the weatherproof cover (250) shown in place around the upper circumference of the receiver (110). A cable (260) is threaded through the rings (140) for securing by a padlock (254). It will be appreciated that the weatherproof cover (250) can be made of a woven material for economy or of rigid materials if a more secure cover was desired. However, it is believed that a woven weatherproof cover will be sufficient in most applications. A determined thief or vandal equipped with a knife can certainly cut through a woven weatherproof cover to obtain access to the clubs, bag, and other materials secured within the receiver (110). By the same token, however, a determined thief or vandal equipped with a bolt cutter or the like could cut through any securing padlock or other reasonably practical means of securing a rigid cover to the receiver (110). Thus, for most applications a woven weatherproof cover (250) will be sufficient to secure the contents of the receiver (110) from inclement weather and from the casual thief or vandal.

Figure 6A:
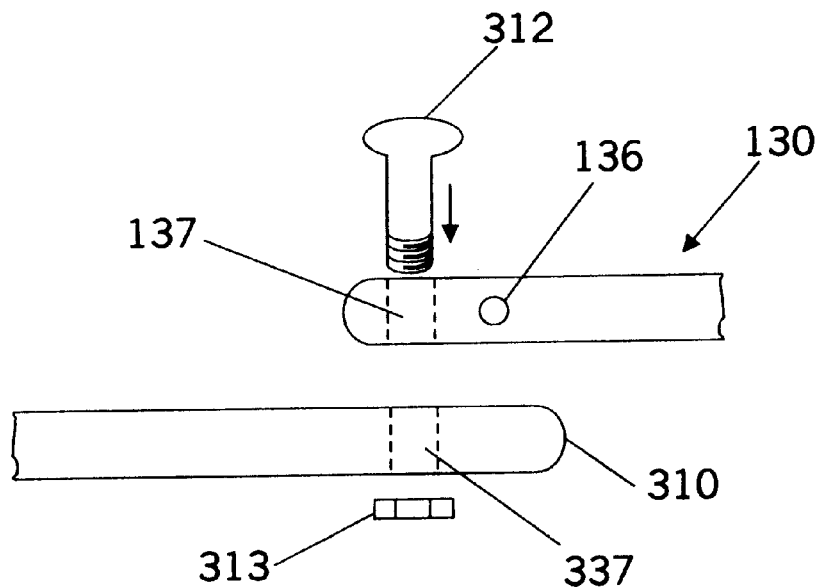
FIGS. 6A and 6B show how the device may be attached to a bar-type trailer hitch receiver and a female-type trailer hitch receiver.
Figure 6B:
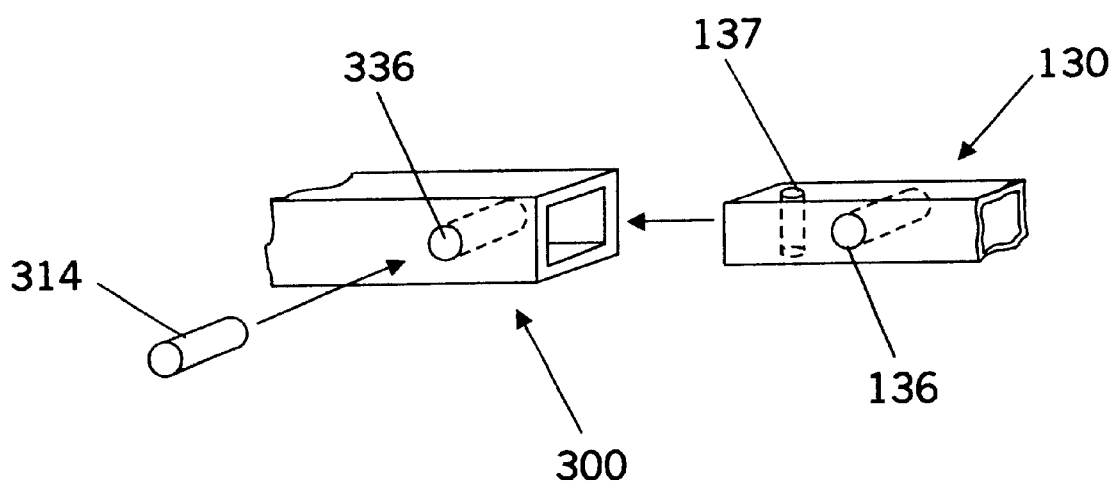

FIG. 6A shows a trailer hitch attachment (130) in use with a bar-type trailer hitch receiver (310). FIG. 6A shows the bar-type receiver (310). The trailer hitch attachment (130) will be aligned above the bar receiver (310) until the vertical bore (137) is aligned with a matching bore (337) on the bar-type receiver (310) then a bolt (312) will be passed through the respective bores (137) and (337) and attached into place by a nut (313). FIG. 6B shows a female-type receiver trailer hitch attachment (130) which will be slid into the female receiver hitch mount (300) in the direction of the arrow until the horizontal bore (136) aligns with the female receiver horizontal bore (336) then a pin (314) will be passed through the bores (336) and (136) respectively and secured into place by means of a cotter pin, clip, nut, or such other type of securing means known to one of skill in the art.

I claim:

1. A carrier for a golf bag having an attached pull cart, the pull cart having a longitudinal support member releasably connected to said golf bag and a pair of wheel assemblies having leg members pivotally connected at a hinge member to said support member at least said predetermined distance above the lower surface of said golf bag said carrier comprising: a right cylindrical receiver having a circular base at a lower end and an open upper end, said receiver having an inner surface defining a vertically extending, upwardly opening cylindrical recess for vertically downwardly receiving said golf bag and supporting a lower surface of said golf bag on said base in a carrying position, said cylindrical recess having a diameter of about 12 inches and a length of about 24 inches; radially projecting attaching means connected at said lower end of said receiver for mounting at the rear of a vehicle; and an outwardly and upwardly opening longitudinal slot formed in said receiver communicating with said recess opposite said attaching means and extending from said upper end and terminating a predetermined distance above said base, said slot having a width sufficient for slidably receiving said leg members as said golf bag and said support member are inserted into said recess with said wheel assemblies disposed exterior of said receiver.

2. The carrier as recited in claim 1 including rotatable wheels connected at said receiver adjacent said base and transverse to said attaching means for permitting rolling movement along a surface.

3. The carrier as recited in claim 2 including a curved connector member releasably connected with said attaching means for coupling with a towing vehicle.

4. The carrier as recited in claim 1 including means for varying the length said attaching means whereby said receiver when mounted on a vehicle may be shifted rearwardly thereof to allow access to said vehicle.

5. The carrier as recited in claim 1 including a second receiver connected to said attaching means.

6. The carrier as recited in claim 1 including a cover member for disposition over said upper member of said receiver.

7. The carrier member as recited in claim 6 wherein said cover member is formed of a weatherproof material.

8. The carrier member as recited in claim 7 wherein said cover member is a woven weatherproof material.

9. The carrier member as recited in claim 6 including lock means for selectively connecting said cover member on said receiver.

10. A golf bag carrier for transporting a golf bag, with an attached pull cart with pivotal wheel assemblies, from a rearwardly projecting trailer hitch at the rear of a vehicle, said golf bag carrier comprising: a right cylindrical receiver having a circular base at a lower end and an open upper end, said receiver having an inner surface defining a cylindrical recess for receiving said golf bag and supporting said golf bag on said base, said cylindrical recess having a diameter sufficient for receiving said golf bag but insufficient for receiving said golf bag and said wheel assemblies; a longitudinal slot formed in said receiver and extending from said upper end toward said base and having a longitudinal length and width for slidably receiving the inner portion of said wheel assemblies adjacent said golf bag with the remainder of said wheel assembly disposed outwardly of said receiver when said golf bag is stowed therewithin; a radially projecting bracket connected at said lower end of said shell opposite said slot for mounting at said trailer hitch of said vehicle.

* * * * *